Sept. 27, 1927.  E. J. HALL  1,643,622
FAN DRIVE FOR ENGINES
Filed May 5, 1923    2 Sheets-Sheet 2
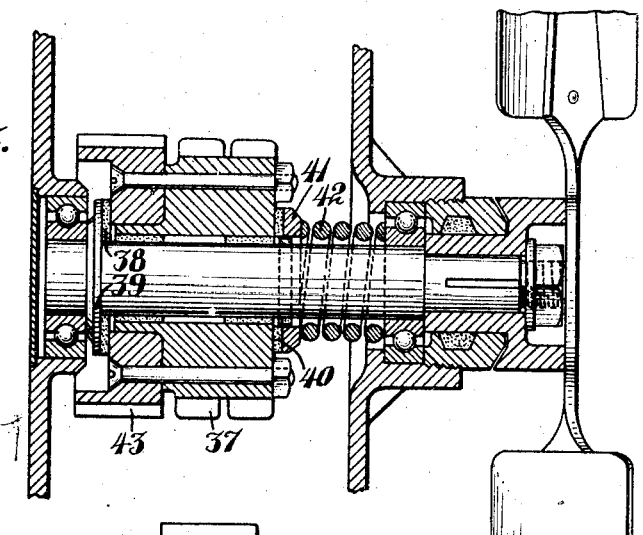
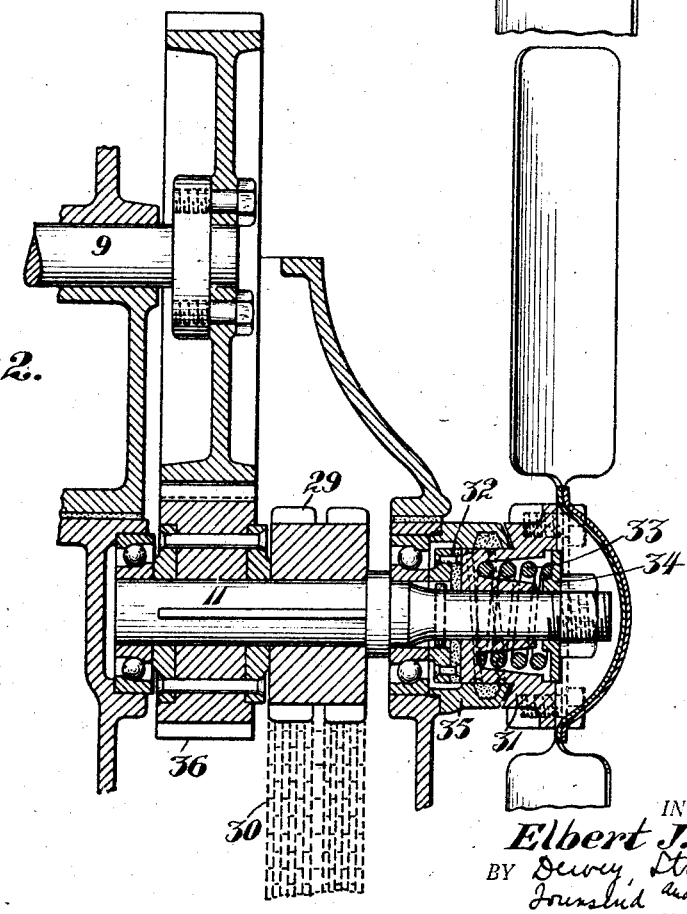
INVENTOR.
Elbert J. Hall
BY Dewey, Strong,
Townsend and Loftus
ATTORNEYS.

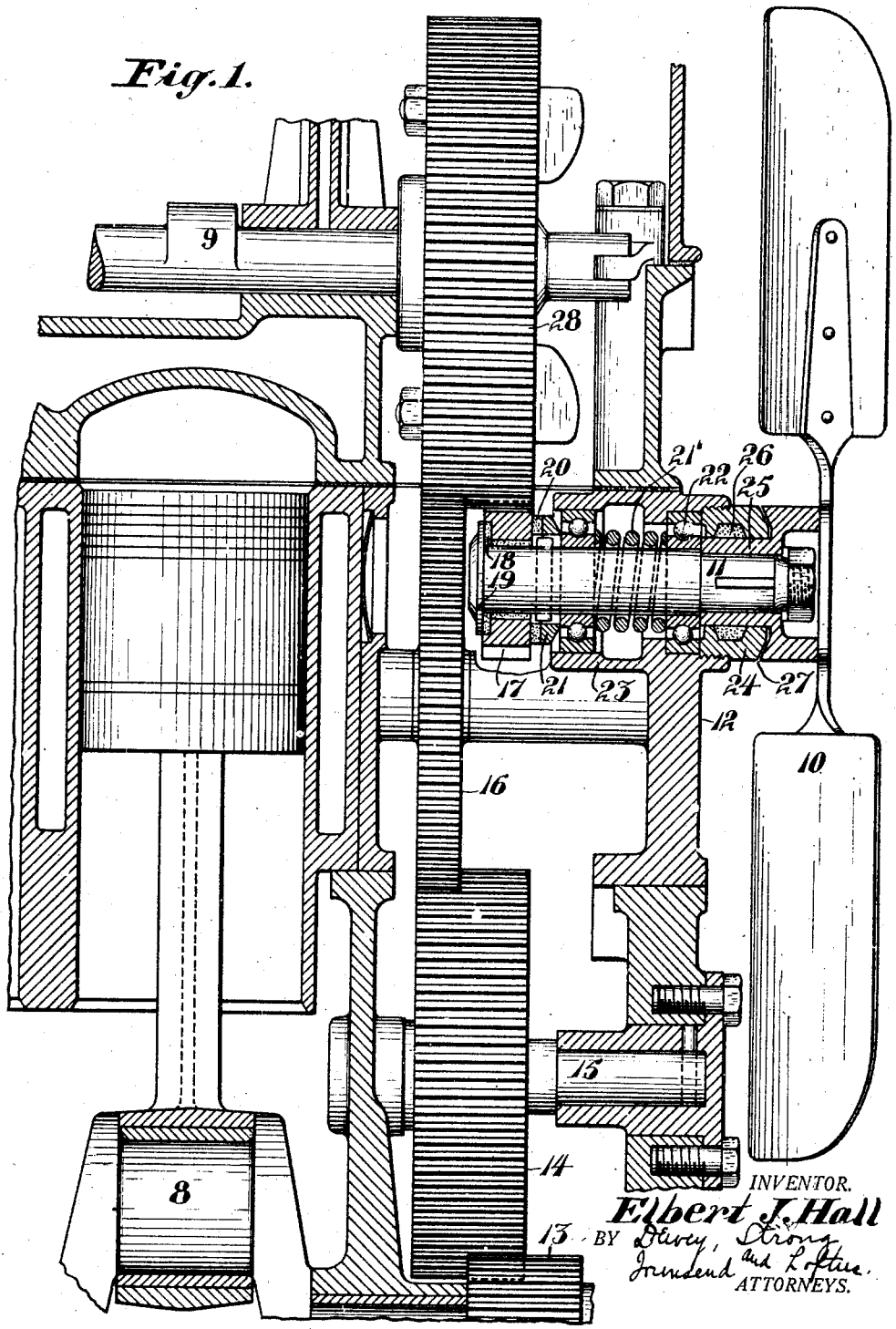

Patented Sept. 27, 1927.

1,643,622

UNITED STATES PATENT OFFICE.

ELBERT J. HALL, OF BERKELEY, CALIFORNIA.

FAN DRIVE FOR ENGINES.

Application filed May 5, 1923. Serial No. 636,979.

This invention relates to a driving mechanism for the cooling fan of an internal combustion engine and has for its object to simplify and improve the construction and operation of such driving mechanism.

This object I accomplish by extending the shaft of the fan through the housing of the engine and arranging a positive driving connection between the inner end of the fan shaft and the crank shaft. I also employ a friction clutch or coupling between the positive drive and the fan so as to permit slippage in case of sudden acceleration of the engine or in the event the fan should meet with an obstruction. By arranging the driving gears or chain within the housing of the engine provision can be made for lubricating the same from the crank case, and likewise the cam shaft can, if desired, be driven from the fan shaft.

In the accompanying drawings—

Fig. 1 shows a vertical, central, sectional view of the front portion of an engine embodying a fan driving mechanism constructed in accordance with my invention.

Figs. 2 and 3 show sectional views of a modified form of the driving mechanism.

Referring in detail to the accompanying drawings, I show in Fig. 1 the front portion of an engine including a crank shaft 8, a cam shaft 9 and a cooling fan 10. The fan is mounted upon a shaft 11 which is journaled upon the engine block or housing 12 and has its inner end extending within the housing. The cam shaft and the fan shaft are driven from the crank shaft through the same train of gearing, said gears being entirely enclosed within the engine housing for protection and lubrication.

As shown in Fig. 1 the gearing includes a drive gear 13 fixed upon the crank shaft and an idler gear 14 fixed upon a short shaft 15 journaled in the engine housing just above the crank shaft. A relatively narrow gear 16 journaled above the gear 14 transmits motion from the latter to a wide gear 28 fixed on the cam shaft. The wide gear 28 meshes also with a pinion 17 loosely mounted on the fan shaft. This pinion 17 transmits motion to the fan shaft by means of a friction coupling comprising a friction disk 18 contacting with one side of the pinion 17 and carried by a flange 19 fixed on the end of the fan shaft. A second friction disk 20 contacts with the opposite side of the pinion 17 and is carried by a ring 21 splined upon the said fan shaft. The splined member is pressed against the pinion 17 by means of an expansible coil spring 21′ surrounding the fan shaft. Anti-friction bearings 22 are provided for the fan shaft and these are supported in a box 23 formed on the side wall of the engine housing.

To provide an oil-tight and dust-proof connection between the fan shaft and the engine housing I arrange an annular flange 24 upon the bearing box 23, said flange fitting over the hub 25 of the fan and carrying a packing gland 26. The joint between the flange 24 and the hub is beveled, as shown at 27, to provide a gristmill seal.

In Fig. 2 I show a modification of the fan drive wherein the fan shaft 11 carries a sprocket wheel 29 driven by a chain 30 connected with a sprocket on the crank shaft. The fan is connected to this shaft by a friction clutch comprising a hub 31 secured to the fan and a friction disk 32 secured to the shaft. A spring 33 abuts against the hub 31 and a flange 34 on the outer end of the shaft and serves to force the friction disk and hub into frictional contact. As in the form shown in Fig. 1 the bearing box for the fan shaft carries an annular flange 35 fitting over the hub 31 and provided with packing material. A spur gear 36 is fixed upon the fan shaft adjacent the sprocket pinion 29 and serves to drive the cam shaft.

The modification shown in Fig. 3 utilizes a chain drive also, but, in this instance, the sprocket pinion 37 is loose upon the fan shaft and a friction coupling is provided between the shaft and sprocket pinion. This coupling comprises a friction disk 38 at one side of the pinion 37 secured to a flange 39 fixed upon the inner end of the fan shaft, and a friction disk 40 at the opposite side of the pinion 37 carried by a splined member 41. An expansible coil spring 42 arranged upon the fan shaft forces the splined member 41 against the sprocket 37 and exerts a thrust in the opposite direction upon the fan shaft. The sprocket 37 has bolted to it a spur pinion 43 for transmitting a drive to the cam shaft. The gears and chains can easily be lubricated by the oil leaking from the cam shaft and by oil picked up by the gears in the crank casing.

In each of the forms herein disclosed I have provided a drive for the fan and cam shaft in which the gears or chains are enclosed within the engine housing and protected thereby and receive lubrication from the crank case. A friction clutch is incorporated in the driving connections for the fan so as to permit slippage of the fan in case of sudden acceleration or stopping of the fan through meeting with an obstruction. The friction clutch is housed and protected against dust and dirt and likewise the joint between the fan shaft and its bearings in the engine housing is made oil-tight and dust-proof.

From the foregoing it will be seen that I have provided a friction clutch drive for the fan which is enclosed within the engine housing and protected thereby and which receives uniform lubrication from the engine oiling system and gives a uniform fan drive under all operating conditions. This is an improvement over having the friction clutch outside where it is exposed to dust and weather and in a short time accumulates grit, dirt and dust and is subject to great variation in temperature under which the fan friction clutch cannot operate properly.

Various changes in the construction and arrangement of the several parts herein shown and described may be employed without departing from the spirit of my invention as disclosed in the appended claims.

Having thus described my invention, what I claim and desire to secure by Letters Patent is:—

1. A driving mechanism for the fan of an internal combustion engine including a fan shaft journaled on the engine housing and extending within the same, a driving gear on the inner end of the fan shaft, driving connections between said gear and the crank shaft arranged within the housing, anti-friction bearings for the fan shaft carried in the engine housing and an oil-tight and dust-proof packing between said shaft and bearings, said packing including a flange on the engine housing fitting over the hub of the fan, and a packing gland between the said flange and hub, the outer end of said flange being bevelled and abutting against an under-cut shoulder on the hub to form a grist-mill seam, the under-cut being directed away from the direction of the blast of the fan.

2. A driving mechanism for the fan of an internal combustion engine including a fan shaft journaled on the engine housing and extending within the same, a driving gear on the inner end of the fan shaft, driving connections between said gear and the crank shaft arranged within the housing, anti-friction bearings for the fan shaft carried in the engine housing and an oil-tight and dust-proof packing between said shaft and bearings, said packing including an annular flange on the bearing box extending over the hub of the fan and a packing gland between said flange and hub, and a shoulder on the fan hub abutting the end of the flange, the abutting ends being beveled, the direction of the bevel and under-cut being away from the direction of the blast of the fan.

ELBERT J. HALL.